United States Patent
Babaee et al.

(10) Patent No.: US 12,500,797 B1
(45) Date of Patent: Dec. 16, 2025

(54) DUTY-CYCLE DISTORTION (DCD) AND BIT-LEVEL INTER-SYMBOL INTERFERENCE (ISI) PRE-COMPENSATION FOR A DIGITAL-TO-ANALOG CONVERTER (DAC)

(71) Applicant: CIENA CORPORATION, Hanover, MD (US)

(72) Inventors: Ramin Babaee, Ottawa (CA); Shahab Oveis Gharan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 49 days.

(21) Appl. No.: 18/742,010

(22) Filed: Jun. 13, 2024

(51) Int. Cl.
*H04L 25/03* (2006.01)

(52) U.S. Cl.
CPC .............. *H04L 25/03019* (2013.01)

(58) Field of Classification Search
CPC ......... H04L 25/03057; H04L 25/03885; H04L 1/0041; H04L 1/0057; H04L 2025/03636; H04L 27/01; H04L 25/03898; H04L 25/49; H04B 10/2507; H04B 7/0408; H04B 7/0417; H04B 7/0617; H04B 7/0695; H04B 10/58; H04B 7/18504; H04B 7/18506; H04W 4/06; H04W 16/24; H04W 36/304; H04W 48/16; H04W 84/06; H04W 16/02; H04W 24/08; H04W 52/0232; H04W 52/0245; H04W 56/00; H04W 72/20; H04W 72/54; H04W 72/542

See application file for complete search history.

(56) References Cited

U.S. PATENT DOCUMENTS

| | | | |
|---|---|---|---|
| 11,817,873 B1 | 11/2023 | Babee et al. | |
| 11,876,525 B2 | 1/2024 | Babaee et al. | |
| 2009/0168931 A1* | 7/2009 | Cases | H04L 7/0338 |
| | | | 375/348 |
| 2009/0168941 A1* | 7/2009 | Zhang | H04L 25/4902 |
| | | | 375/371 |
| 2018/0090222 A1* | 3/2018 | St Germain | G11C 8/06 |
| 2018/0212617 A1* | 7/2018 | He | H03M 3/464 |
| 2018/0217807 A1* | 8/2018 | Duewer | G06F 3/162 |
| 2025/0105852 A1* | 3/2025 | Galton | H03M 1/0673 |
| 2025/0202586 A1* | 6/2025 | Buscaino | H04B 10/58 |

OTHER PUBLICATIONS

"An 8b 160GS/s 57GHz Bandwidth Time-Interleaved DAC and Driver-Based Transmitter with Adaptive Calibration for 800Gb/s Coherent Optical Applications in 5nm", 2024 ISSCC International Solid-State Circuits Conference, Feb. 18-22, 2024, 3 pages.

Radulov, Georgi Ivanov, "Flexible and self-calibrating currentsteering Digital-to-Analog Converters: analysis, classification and design", Jan. 14, 2010, 291 pages.

* cited by examiner

*Primary Examiner* — Eva Y Puente
(74) *Attorney, Agent, or Firm* — Guntin & Gust, PLC; Kenneth S. Kwan

(57) ABSTRACT

Aspects of the subject disclosure may include, for example, obtaining a digital input signal for conversion into analog by a digital-to-analog converter (DAC), and performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC. Other embodiments are disclosed.

20 Claims, 15 Drawing Sheets

DUTY-CYCLE DISTORTION (DCD) AND BIT-LEVEL INTER-SYMBOL INTERFERENCE (ISI) PRE-COMPENSATION FOR A DIGITAL-TO-ANALOG CONVERTER (DAC)

FIELD OF THE DISCLOSURE

The subject disclosure relates to duty-cycle distortion (DCD) and bit-level inter-symbol interference (ISI) pre-compensation for a digital-to-analog converter (DAC).

BACKGROUND

With the increase in bandwidth of single-carrier optical signals, designing DACs that operate at high sampling rates has become increasingly challenging. Certain DAC architectures, particularly those that include time-interleaved sub-DACs, have been adopted to meet this challenge. These DAC architectures either utilize a mixer or a multiplexer (MUX) that operates based on the sampling rate to select the output of each sub-DAC at the final stage of the analog path.

BRIEF DESCRIPTION OF THE DRAWINGS

Reference will now be made to the accompanying drawings, which are not necessarily drawn to scale, and wherein.

DETAILED DESCRIPTION

Figure 1:
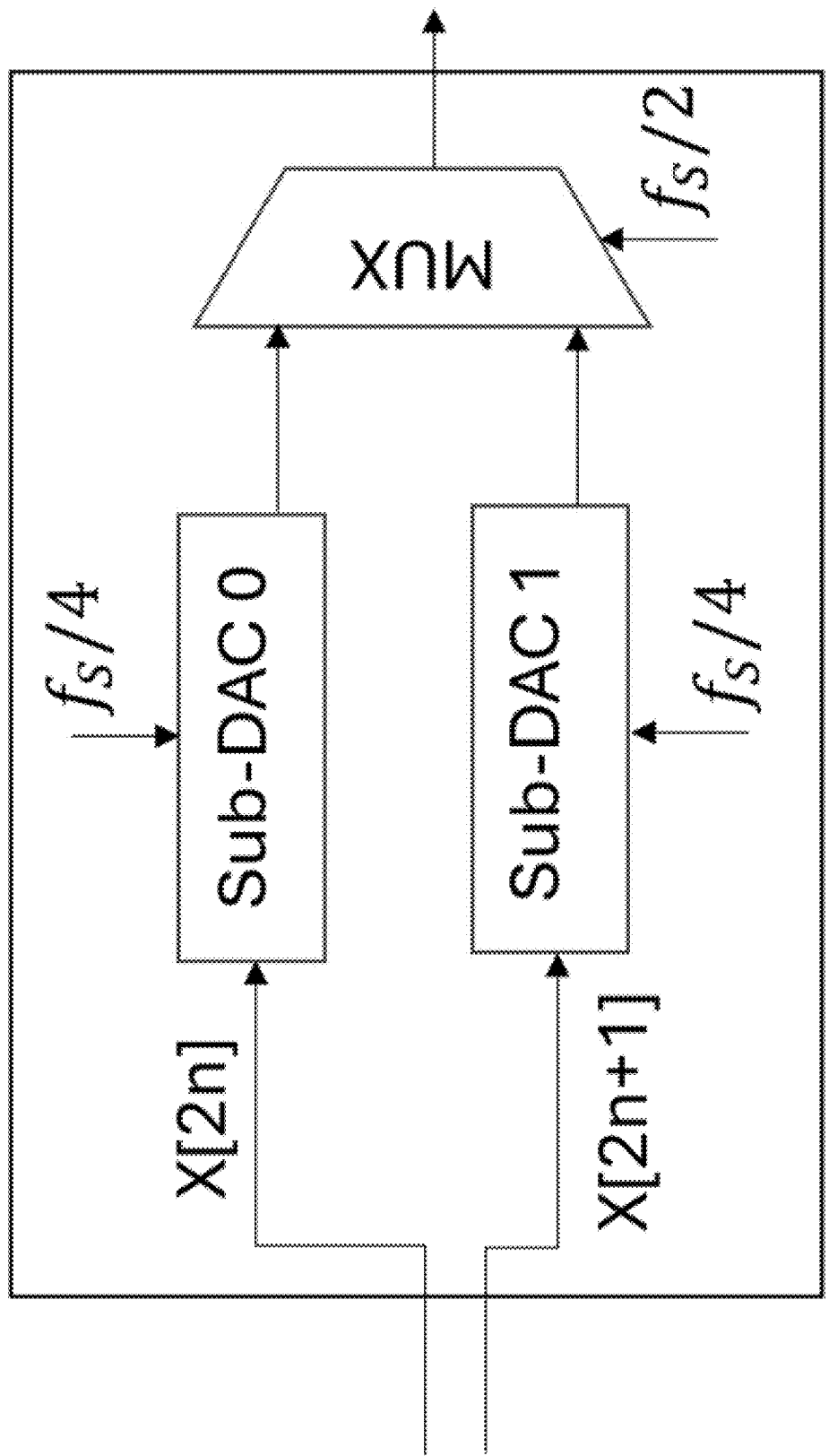
FIG. 1 is a block diagram of an example MUX-based DAC design.

While sub-DACs in a time-interleaved DAC generally have good performance, there is nevertheless significant performance degradations, particularly at higher operating frequencies. FIG. 1 is a block diagram of an example MUX-based DAC design. In this design, a MUX selects the output of each sub-DAC on a round robin basis, but adds a deterministic distortion at the output, namely DCD. There are multiple phenomena that can cause DCD. First, DCD occurs if the even sub-DAC is sampled by the interleaver over a longer period than the odd sub-DAC—i.e., asymmetry between the positive and negative half-cycles of the sampling frequency (fs)/2 clock that is driving the interleaver—i.e., DCD-fs/2. Another possible source of DCD is the phase difference between the sampling of even and odd sub-DACs. If the fs/4 clocks that drive the sub-DACs are not properly phase-aligned, the output becomes distorted—i.e., DCD-fs/4. The DCD-fs/K clock manifests itself in the frequency domain as an image at $\pm f \pm f_s/K$, where f is the principal frequency of the input signal, and where K represents the denominator term of the relevant clock (i.e., K=2 for fs/2, K=4 for fs/4, etc.). In a MUX/interleaver architecture, DCD-fs/2 and DCD-fs/4 may be prominent distortions. In a time-interleaved return-to-zero architecture involving a mixer, the output of each sub-DAC is multiplied by a pulse that is only '1' for that clock cycle. For instance, if there are two sub-DACs in the architecture, sub-DAC 0 is multiplied by '1' in the first clock cycle and then multiplied by '0' in the second clock cycle. The opposite is performed for sub-DAC 1. The signals from these two sub-DACs are then summed together to form the output. Such pulse generation is done using clocks and is not perfect, resulting in DCD. In a mixer-based architecture where the outputs of, say, four sub-DACs are mixed, DCD-fs/2, DCD-fs/4, and DCD-fs/8 may be prominent distortions.

In addition to DCD, time-interleaved architectures also suffer from ISI at the bit-(or equivalently, switch-) level of each sub-DAC. Each bit of each sub-DAC "observes" interference from the samples before it and after it due to different amplitude responses of the current switches (that is, the switches in the different sub-DACs may not have identical characteristics, such as threshold voltages, saturation currents, and/or rise/fall times). This is referred to herein as bit-level ISI.

Babaee et al. U.S. Pat. No. 11,876,525, entitled "Digital-To-Analog Converter (DAC) Distortion Pre-Compensation" (which is incorporated herein by reference in its entirety), describes pre-compensation for dynamic glitches within sub-DACs. Babaee et al. U.S. Pat. No. 11,817,873, entitled "Digital-To-Analog Converter (DAC) Architecture Optimization" (which is incorporated herein by reference in its entirety), describes DAC architecture design(s) for reducing error(s) associated with the analog output. Ahmad et al., "An 8b 160 GS/s 57 GHz Bandwidth Time-Interleaved DAC and Driver-Based Transmitter with Adaptive Calibration for 800 Gb/s Coherent Optical Applications in 5 nm", Marvell, ISSCC 2024 Feb. 20, 2024 (hereafter "Marvell") (which is incorporated herein by reference in its entirety), describes a DAC digital pre-compensation scheme that only corrects for timing offsets among sub-DACs. Marvell does not discuss pre-compensation for bit-level ISI.

The subject disclosure describes, among other things, illustrative embodiments of a method and system that is capable of providing efficient, digital pre-compensation for DCD and bit-level ISI in a DAC. In various embodiments, the pre-compensation scheme may be devised based on time domain-based mathematical modeling of the DCD and bit-level ISI and learning or extraction of DCD and bit-level ISI pre-compensation parameters from the modeling. In one or more embodiments, the scheme may be implemented in one or more programmable circuits that interface with the input of a DAC.

Exemplary embodiments described herein provide a general DCD pre-compensation scheme that not only pre-compensates for timing delays among sub-DACs, but that also corrects amplitude response differences. The bit-level ISI pre-compensation provides further improvements in the analog output. Indeed, it is expected that embodiments of the pre-compensation scheme described herein can correct for such impairments in the digital domain, providing about 2 to 5 decibels (dB) of DAC Signal-to-Noise-and-Distortion Ratio (SNDR) improvement. Where the pre-compensation circuit is used in a coherent modem, for instance, improvement in the DAC SNDR would in turn improve the overall SNR of the modem.

One or more aspects of the subject disclosure include a device, comprising a processing system including a processor, the processing system being coupled to a memory that stores executable instructions or data that, when executed or utilized by the processing system, facilitate performance of operations. The operations can include obtaining a digital input signal for conversion into analog by a digital-to-analog converter (DAC). The operations can further include performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

One or more aspects of the subject disclosure include a non-transitory machine-readable medium, comprising executable instructions that, when executed by a processing system including a processor, facilitate performance of operations. The operations can include obtaining a digital input signal for conversion into analog by a digital-to-analog converter (DAC). The operations can further include performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

One or more aspects of the subject disclosure include a method. The method can include obtaining, by a processing system including a processor, a digital input signal for conversion into analog by a digital-to-analog converter (DAC). The method can further include performing, by the processing system, filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

Other embodiments are described in the subject disclosure.

Figure 2A:
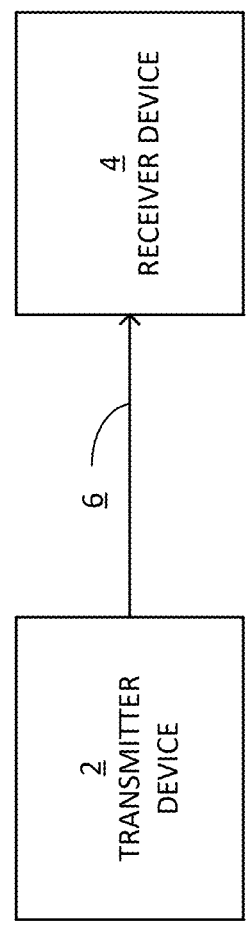
FIG. 2A is a diagram of a non-limiting example of a communication network in accordance with various aspects described herein.

FIG. 2A is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver.

The communication network 1 may include additional elements not shown in FIG. 2A. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 2A, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2B:
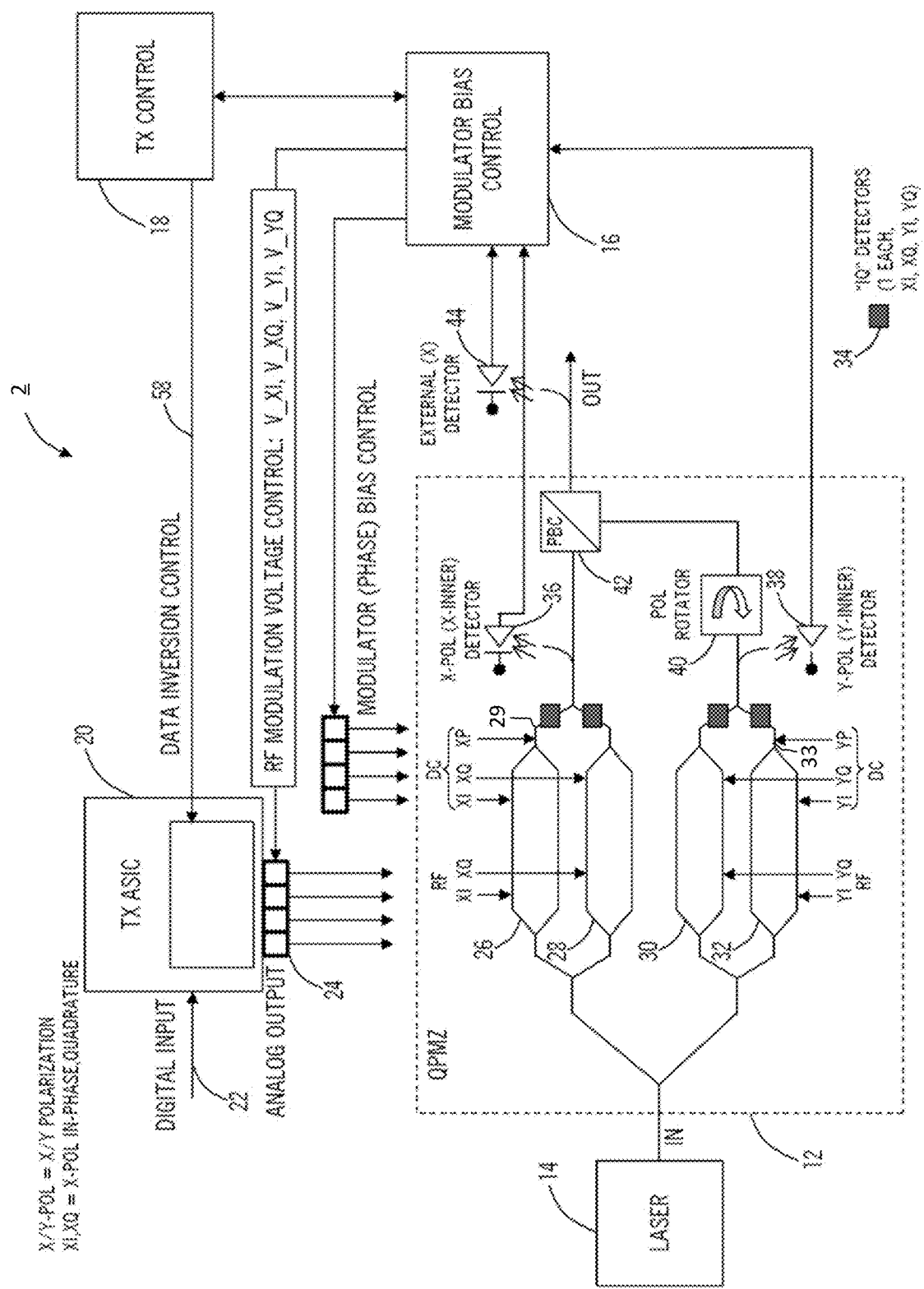
FIG. 2B is a block diagram of an example, non-limiting embodiment of a transmitter/modulator system in accordance with various aspects described herein.

FIG. 2B is a block diagram of an example, non-limiting embodiment of a transmitter/modulator system 2 in accordance with various aspects described herein. As shown in FIG. 2B, the transmitter device 2 may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ—resulting in a quad parallel MZ (QPMZ) modulator.

In one or more embodiments, the optical modulator system 2 may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 2B, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Figure 2C:
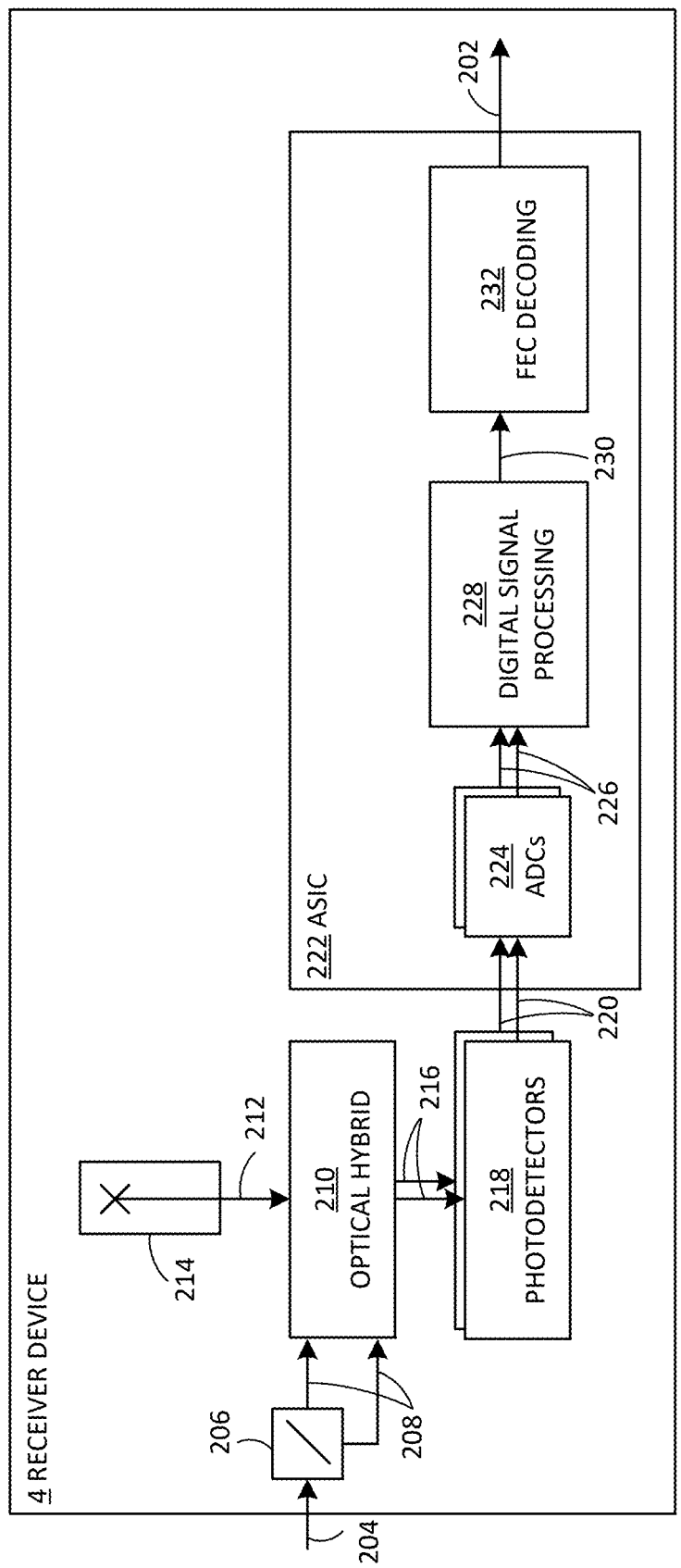
FIG. 2C is a block diagram of an example, non-limiting embodiment of a receiver device in accordance with various aspects described herein.

FIG. 2C is a block diagram of an example, non-limiting embodiment of a receiver device 4 in accordance with various aspects described herein. In various embodiments, the receiver device 4 may be configured to receive an optical signal 204, which may comprise a degraded version of an optical signal generated by a transmitter device (e.g., the transmitter device 2 of FIG. 2A). The optical signal generated by the transmitter device may be representative of information bits (also referred to as client bits) which are to be communicated to the receiver device 4. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like.

The receiver device 4 may be configured to recover corrected client bits 202 from the received optical signal 204. The receiver device 4 may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog electrical signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 2C, the receiver device 4 may include an ASIC 222. The ASIC 222 may include analog-to-digital converters (ADCs) 224 that are configured to sample the analog electrical signals 220 and generate respective digital signals 226. In certain alternate embodiments, the ADCs 224 or portions thereof may be separate from the ASIC 222. The ADCs 224 may sample the analog electrical signals 220 periodically at a sample rate that is based on a signal received from a voltage-controlled oscillator (VCO) at the receiver device 4 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset fIF (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

Modeling distortions, such as DCD, can be done in the frequency domain. Here, either the digitally-sampled version of a single tone waveform (i.e., a SINE wave) may be swept, or the digitally-sampled version of a multi-tone waveform (i.e., that additively includes multiple SINE waves at different frequencies) may be inputted, into a DAC under test. The Fast Fourier Transform (FFT) of the output of the DAC then allows for analysis and characterization of the overall performance of the DAC as a function of frequency. While it is possible to extract DCD in the frequency domain, in the real world, DAC inputs are generally not mere SINE waves, but are rather Gaussian signals that occupy wide spectra. Embodiments described herein therefore involve modeling of DCD and bit-level ISI in the time domain and derivation of pre-compensation filters based on such modeling.

Figure 2D:
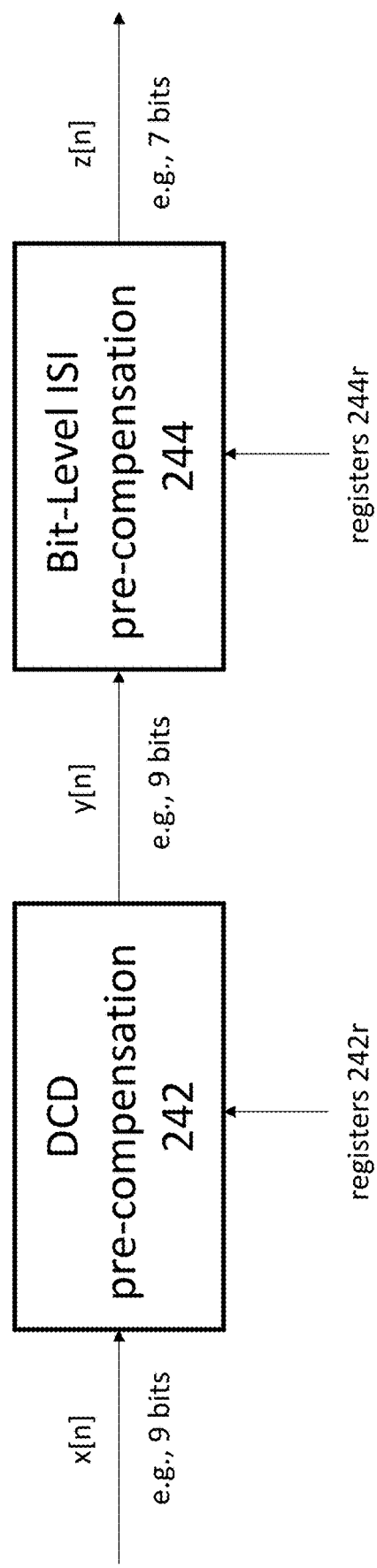
FIG. 2D is a high level block diagram of an example DAC (e.g., non-linear) pre-compensation system in accordance with various aspects described herein.

FIG. 2D is a high level block diagram of an example DAC (e.g., non-linear) pre-compensation system 240 in accordance with various aspects described herein. The pre-compensation system 240 may include a DCD pre-compensation block (or filter) 242 and a bit-level ISI pre-compensation block (or filter) 244. Each of the DCD pre-compensation block 242 and the bit-level ISI pre-compensation block 244 may be implemented in hardware, firmware, or a combination of hardware and software. Registers 242r may be programmable memories that firmware or software can program to adjust filter parameters of the DCD pre-compensation block 242. Similarly, registers 244r may be programmable memories that firmware or software can program to adjust filter parameters of the bit-level ISI pre-compensation block 244. The DCD pre-compensation block 242 may be configured to pre-compensate for contributions of DCD. The bit-level ISI block 244 may be configured to pre-compensate for contributions of bit-level ISI. These DCD and bit-level ISI pre-compensation operations may subtract estimated DCD and bit-level ISI contributions from the DAC input x[n], resulting in a pre-compensated output z[n] that can then be sent to the DAC.

Figure 2E:
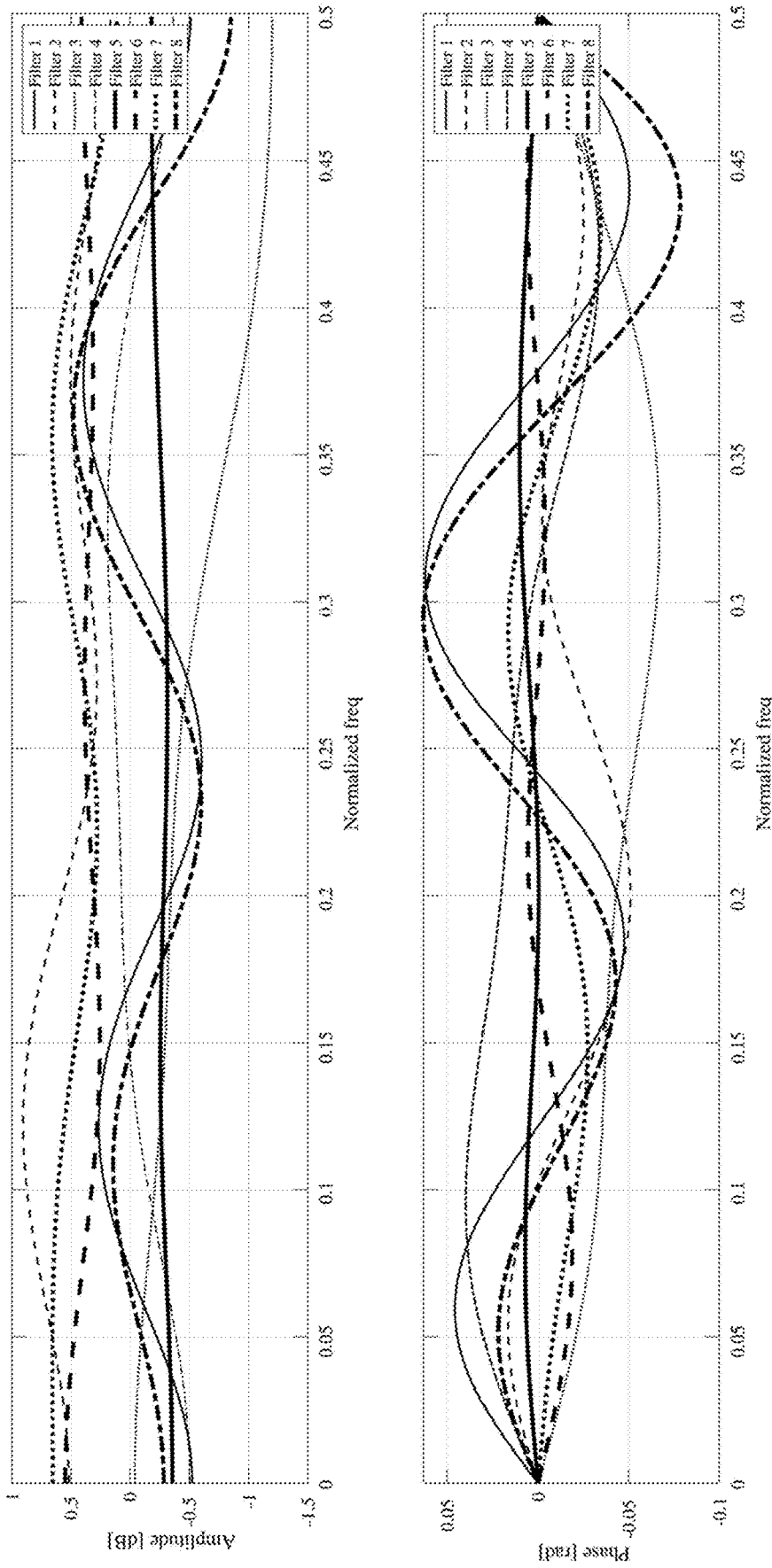
FIG. 2E shows the amplitude and phase responses of DCD-fs/8.

DCD may be common to all bits since the outputs of the sub-DACs are analog signals that feed into the MUX, which subsequently subjects the analog signals (rather than the individual bits) to DCD. DCD of a DAC may be modeled in the time domain. For instance, an input signal may be fed into the DAC, an output analog signal may be captured from the output of the DAC, and the output analog signal may be compared with an (e.g., ideal) analog signal that corresponds to the input signal, where an "error" observed from the comparison may be modeled to obtain pre-compensation parameters. In exemplary embodiments, DCD-fs/K may be modeled as K independent finite impulse response (FIR) filters of length 2M+1, as:

$$DCD - fs/K \text{ contribution} = \sum_{i=-M}^{M} x[n-i]g_{n \text{ modulo } K}[i]$$

where K corresponds to the number of phases or clock cycles, where x[n] is the input to the DAC (e.g., a random input), and where 2M+1 is the number of taps or coefficients. In a case where M=2, the center tap may correspond to time 0 with M taps on the left (non-causal) and M taps on the right (causal). The modulo operation allows for periodicity of the distortion to be accounted for. For instance, in a case where K=8, the fs/8 clock may have 8 repeating phases or clock cycles within one period of the sampling frequency fs, where every 8th phase or clock cycle is subjected to DCD. The $g_n$ filter functions may be extracted by fitting in—e.g., via least square fitting or the like—the error determined from the difference between a captured output of the DAC and the desired output corresponding to the input (i.e., the distortion that is added at the DAC level). This may result in (e.g., optimal) filter values that reduce or minimize the error squared. FIG. 2E shows the amplitude and phase responses of DCD-fs/8. The plots in FIG. 2E represent the FFTs of eight $g_n$ filters that can be learned or extracted from the time domain modeling. Filters learned in this manner may be implemented in the digital domain (e.g., and applied on the input signal) to pre-compensate for DCD (described in more detail below).

Figure 2F:
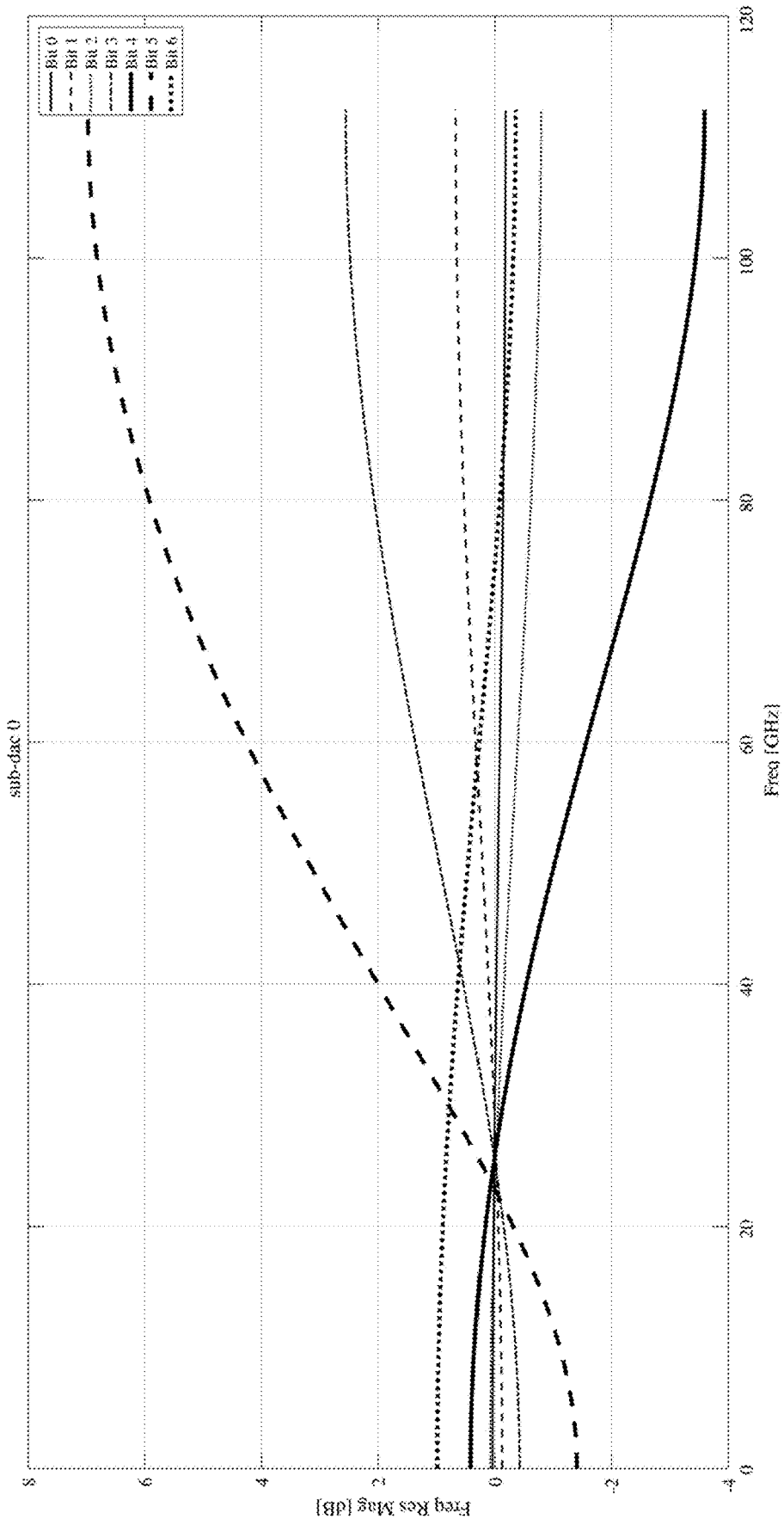
FIGS. 2F and 2G show the frequency responses of bit-level ISI in sub-DACs of a DAC.
Figure 2G:
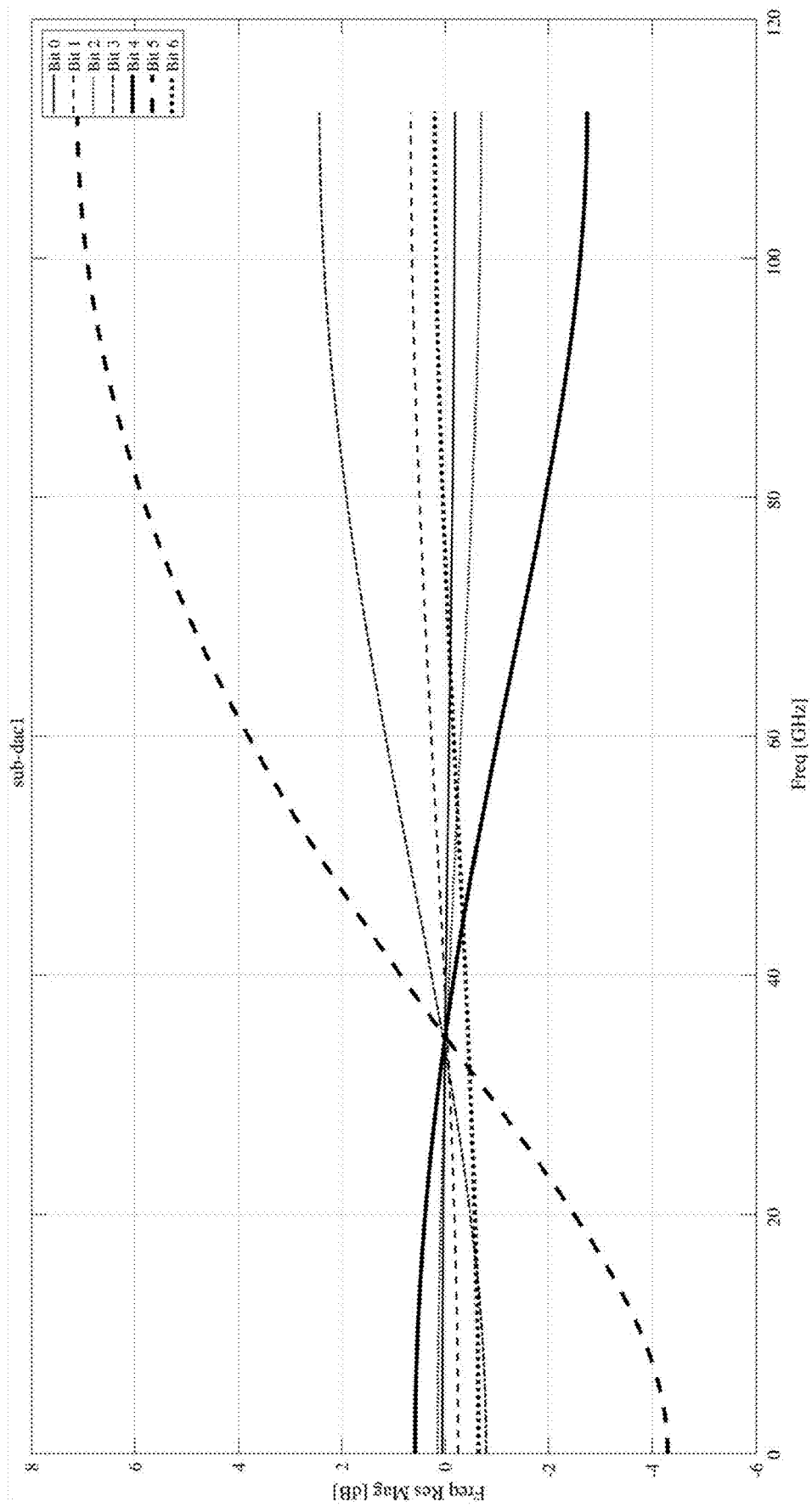

Bit-level ISI of a DAC may also be modeled in the time domain. In exemplary embodiments, bit-level ISI may be modeled as follows:

$$y[n] := \sum_{k=1}^{B}(b_k[n] * h_{k,n \text{ modulo } K}[n]) \cdot 2^{-k} =$$

$$\sum_{k=1}^{B} 2^{-k} \sum_{i=-L}^{L}(b_k[n-i] * h_{k,n \text{ modulo } K}[i])$$

where B is the bit length of the DAC, where bk [n] is the k-th bit of input x[n], and where $h_{k, n \text{ modulo } K}$ is the response of bit k for sub-DAC n modulo K. Generally speaking, this models bit-level ISI as a set of B filters that each corresponds to an impulse response of a respective bit. The term $2^{-k}$ in the model represents the weight of each bit for k=1: B, where 1 is the most significant bit and B is the least significant bit. As an example, for a 7-bit DAC, the value of 0000101 would be $1*2^{-7}+1*2^{-5}$. The $h_k$ filter functions may be extracted by fitting in—e.g., via least square fitting or the like—the error determined from the difference between a captured output of the DAC and the desired output corresponding to the input (i.e., the distortion that is added at the DAC level). This may result in (e.g., optimal) filter values that reduce or minimize the error squared. The modulo operation allows for periodicity of the distortion to be accounted for. As an example, for a 7-bit DAC, and in a case where K=4, the fs/4 clock may have 4 repeating phases or clock cycles. Here, pairs of bits may be convolved with a given phase of modulo K—e.g., for x[n], the first symbol x[0] may be convolved with h[0], x[1] may be convolved with h[1], x[2] may be convolved with h[2], and x[3] may be convolved with h[3], where x[4] may then be convolved with h[0] again, etc. The overall compensation mechanism for bit-level ISI is similar to that described above for DCD, except that an independent filter is required for each bit involved. As an example, for two sub-DACs at 7-bit resolution, 2×7=14 independent filters would be needed—i.e., where filters 1 to 7 respectively operate on bits 1 to 7 of sub-DAC 0 and filters 8 to 14 respectively operate on bits 1 to 7 of sub-DAC 1. As another example, for four sub-DACs at B-bit resolutions, 4×B independent filters would be needed. FIGS. 2F and 2G show the frequency responses of bit-level ISI in sub-DACs 0 and 1 of a DAC. The plots in FIG. 2F represent the FFTs of seven $h_k$ filters for sub-DAC 0 that can be learned or extracted from the time domain modeling. The plots in FIG. 2G represent the FFTs of seven h filters for sub-DAC 1 that can be learned or extracted from the time domain modeling. Filters learned in this manner may be implemented in the digital domain (e.g., and applied on the input signal) to pre-compensate for bit-level ISI (described in more detail below).

Figure 2H:
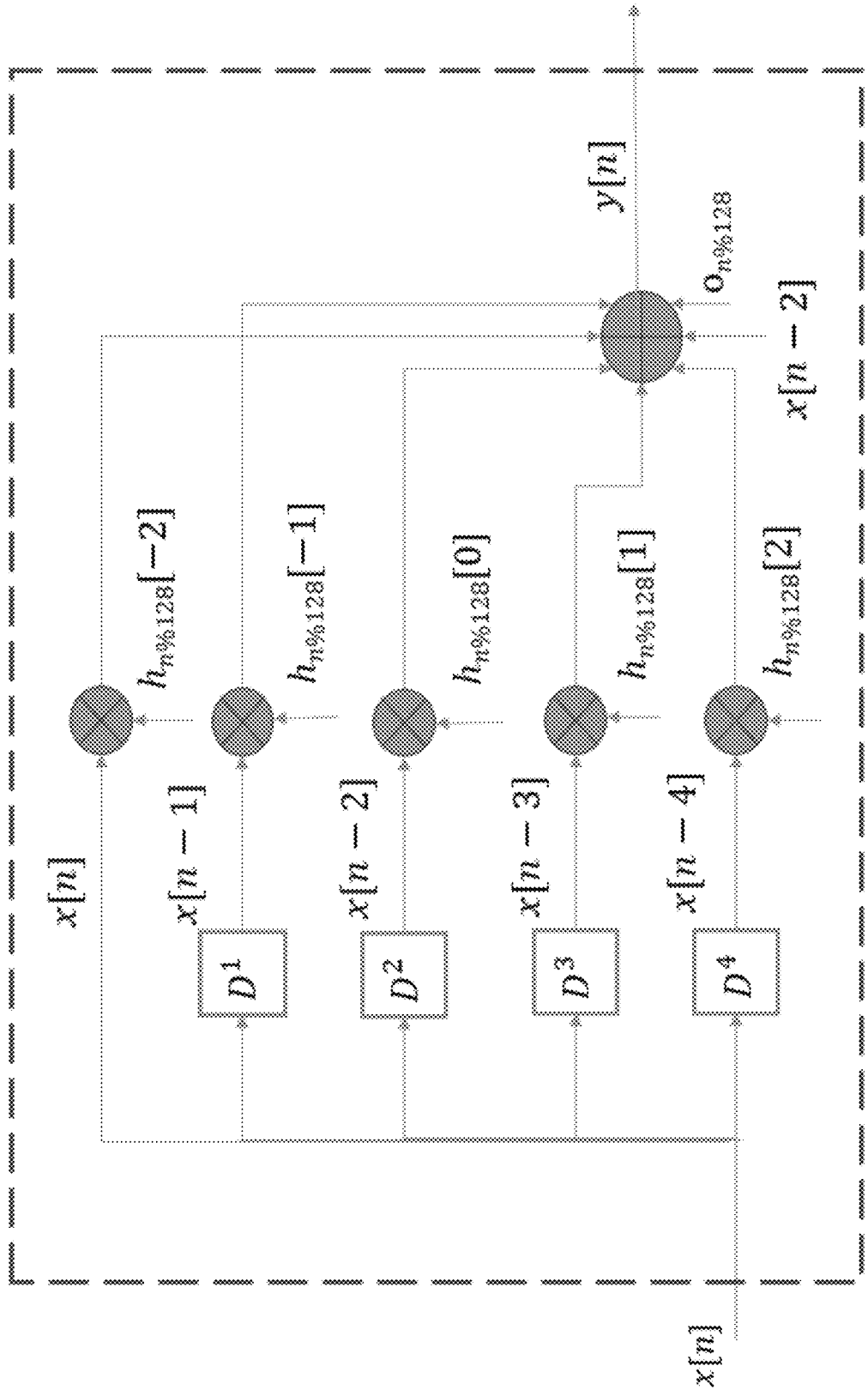
FIG. 2H shows an example implementation of DCD pre-compensation in the digital domain, in accordance with various aspects described herein.

FIG. 2H shows an example implementation of the DCD pre-compensation block 242 of FIG. 2D in the digital domain, in accordance with various aspects described herein. This example 5-tap (i.e., M=2) implementation corresponds to the following formula and compensates for DCD-fs/128, DCD-fs/64, DCD-fs/32, . . . , all the way to DCD-fs/2. It has been observed that there is a periodicity of 128 samples in the fs/2 clock that operates the MUX; hence DCD-fs/128. Thus, any clock distortions that are repeating modulo 128 can be compensated using this model:

$$\forall n \mid 0 \le n \le 127: y[n] = x[n-2] + \sum_{k=-2}^{2} \alpha_n[k] \cdot x[n-2-k] + o_n[n]$$

The DCD pre-compensation here may reverse the effects of the $g_n$ filters learned using the time domain modeling of DCD described above. In various embodiments, each filter instance n (which corresponds to K in the time-domain modeling of DCD-fs/K contribution described above) may be made programmable, so that the values of the filter taps may be adjusted and programmed into hardware. Here, x[n−2] represents the input that is to be sent to the DAC. Since the DAC would be subjected to $$-\sum_{k=-2}^{2} \alpha_n[k] \cdot x[n-2-k],$$

the DCD pre-compensation here may add in this term as $$+\sum_{k=-2}^{2} \alpha_n[k] \cdot x[n-2-k],$$

where the summation adds the convolutions of the 5 taps. The DCD pre-compensation thus allows the input signal x[n−2] to remain at the DAC output. One skilled in the art would understand and appreciate that implementation of the DCD pre-compensation block 242 may be different than that shown in FIG. 2H depending on the length of the DAC, the symbol size used, and/or the number of taps used.

The term $o_n[n]$ represents (e.g., programmable) offsets that may be needed to compensate for any feed through clocks (of various frequencies) that are independent of the input signal and that may appear at the DAC output. For instance, for DCD-fs/128, the offset term $o_n[n]$ (e.g., here, 128 offsets for 128 filters) may allow for removal of an fs/128 tone at the output, particularly by applying a negative of the fs/128 tone. This may be useful in certain hardware implementations. The offset term $o_n[n]$ may be optional in a case where there is no need or no desire for such compensation.

Figure 2I:
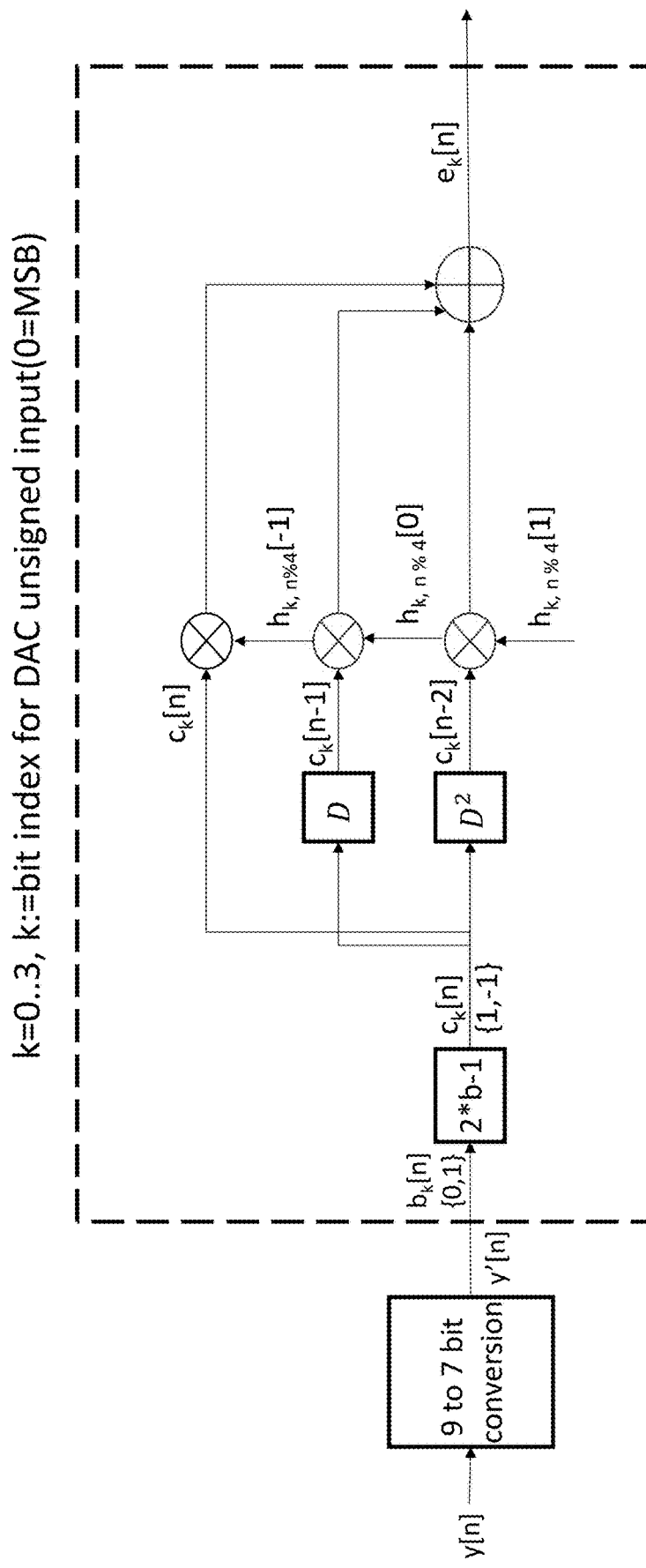
FIGS. 2I to 2K show an example implementation of bit-level ISI pre-compensation in the digital domain, in accordance with various aspects described herein.
Figure 2J:
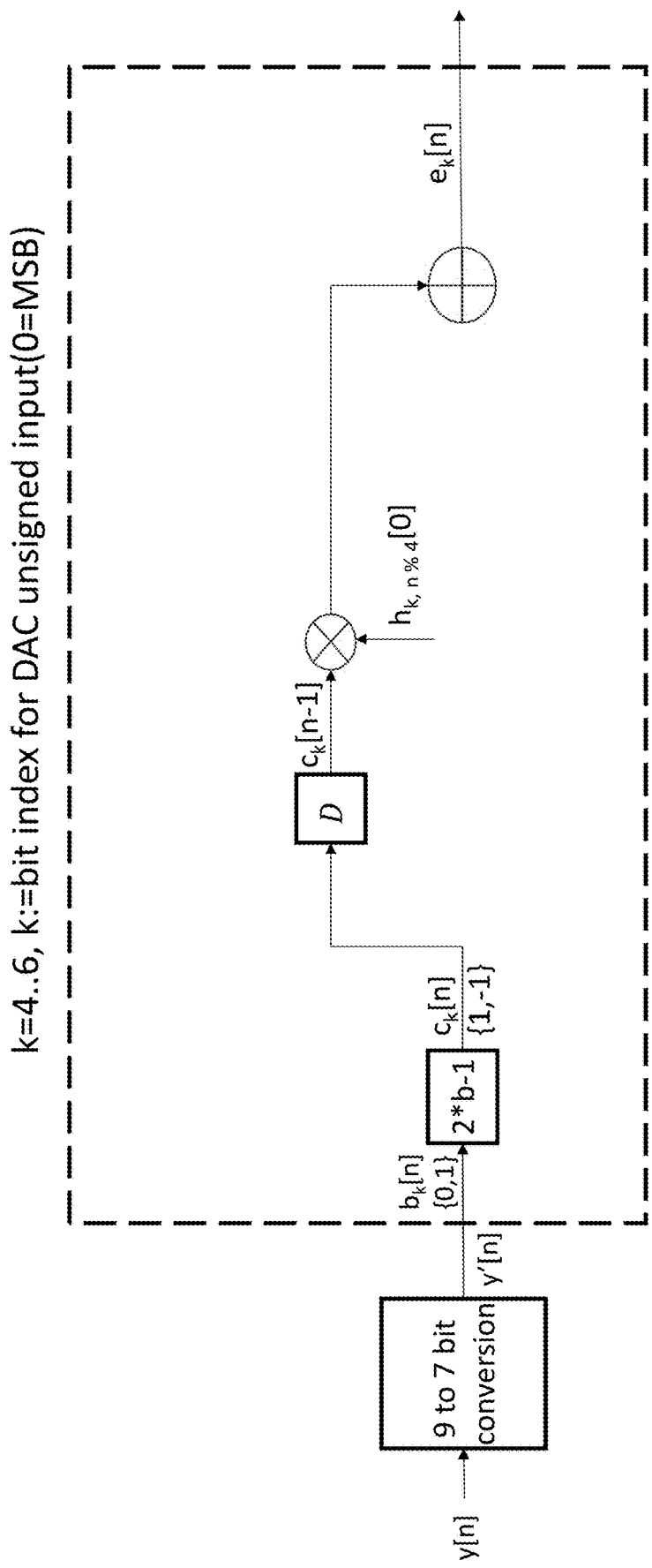
Figure 2K:
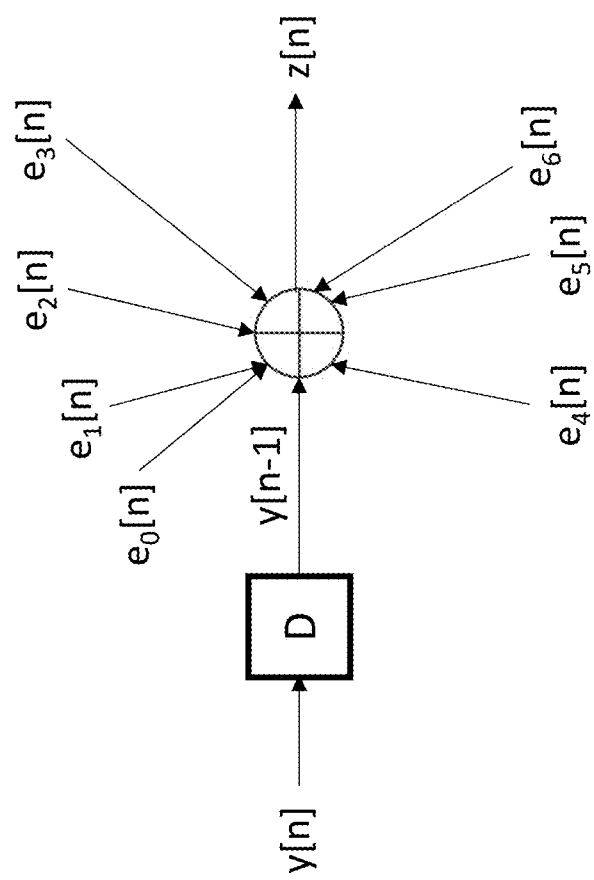

FIGS. 2I to 2K show an example implementation of the bit-level ISI block 244 of FIG. 2D in the digital domain, in accordance with various aspects described herein. The bit-level-ISI pre-compensation here may reverse the effects of the $h_k$ filters learned using the time domain modeling of bit-level ISI described above. The implementation corresponds to a 7-bit DAC, where a 3-tap FIR filter is used for the first 4 bits of a converted input y'[n] (e.g., from a 9-bit input symbol to a 7-bit value, which conversion can be effected by dropping the 2 least significant bits and keeping the 7 most significant bits or by rounding the 9 bits to 7 bits) (FIG. 2I), and where a 1-tap FIR filter is used for the last 3 bits of the converted input y'[n] (FIG. 2J). The summation function shown in FIG. 2K corresponds to the summation in the time domain model of bit-level ISI described above. The implementation chosen is motivated based on observations of $h_k[1]$ and $h_k[-1]$ being at or about 0 for bits 4, 5, 6, thus obviating a need for their implementation (i.e., a savings of two multipliers). One skilled in the art would understand and appreciate that implementation of the bit-level ISI pre-compensation block 244 may be different than that shown in FIGS. 2I to 2K depending on the length of the DAC, the symbol size used, and/or the number of taps used.

The pre-compensation implementation shown in FIG. 2D provides a sequence of pre-compensation—i.e., DCD pre-compensation followed by bit-level ISI pre-compensation—that is inverse of the sequence of distortions experienced in the DAC—i.e., first bit-level ISI followed by DCD, which allows for a sort of commutative pre-compensation effect. It is to be understood and appreciated, however, that implementations other than in this serial manner are also possible.

Figure 2L:
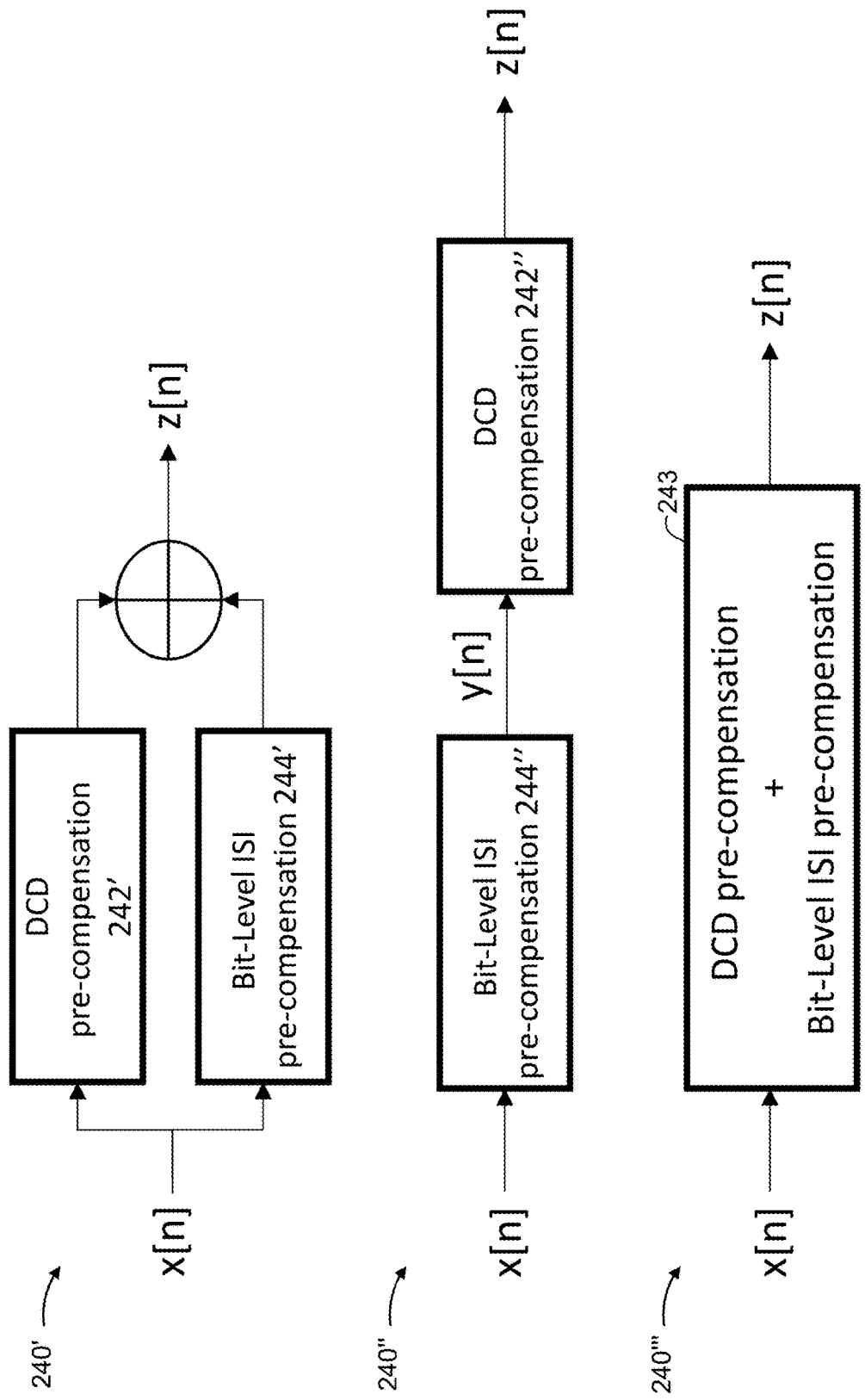
FIG. 2L shows three alternative DCD and bit-level ISI pre-compensation implementations in accordance with various aspects described herein.

FIG. 2L shows three alternative DCD and bit-level ISI pre-compensation implementations in accordance with various aspects described herein.

Alternative scheme 240' may include a DCD pre-compensation block 242' and a bit-level ISI pre-compensation block 244' that are implemented in parallel. The outputs of these blocks 242' and 244' may be summed to provide the resulting pre-compensated output. The same DCD and bit-level ISI pre-compensation implementations (i.e., the same filters/coefficients) described above with respect to the serial implementation in FIG. 2D may be applied here in parallel scheme 240'. While the serial implementation provides higher pre-compensation accuracy, the parallel implementation has a lower computation delay.

Alternative scheme 240" may provide a sequence of pre-compensation that is the reverse of that of the implementation shown in FIG. 2D—i.e., bit-level ISI pre-compensation by a bit-level ISI pre-compensation block 244" followed by DCD pre-compensation by a DCD pre-compensation block 242". Again, the same DCD and bit-level ISI pre-compensation implementations (i.e., the same filters/coefficients) described above with respect to the implementation in FIG. 2D may be applied here in scheme 240".

Alternative scheme 240''' may include a single pre-compensation block 243 that provides both DCD and bit-level ISI pre-compensation. Here, the pre-compensation block 243 may provide for DCD pre-compensation at the individual bit level (despite DCD being common to all bits) along with bit-level ISI pre-compensation. In implementation, the DCD and bit-level ISI pre-compensation filters may be applied to each stream of bits per sub-DAC, where filtering according to the above-described DCD compensation algorithm would compensate for the common function across all of the bits, and where filtering according to the above-described bit-level ISI compensation algorithm would compensate for the differences between each bit transfer function.

It is to be understood and appreciated that, although one or more of the drawing figures might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various blocks, components, devices, systems, modules, circuits, etc. may have been illustrated in one or more of the drawings figures as separate blocks, components, devices, systems, modules, circuits, etc., it will be appreciated that multiple blocks, components, devices, systems, modules, circuits, etc. can be implemented as a single block, component, device, system, module, circuit, etc., or a single block, component, device, system, module, circuit, etc. can be implemented as multiple blocks, components, devices, systems, modules, circuits, etc. Additionally, functions described as being performed by one block, component, device, system, module, circuit, etc. may be performed by multiple blocks, components, devices, systems, modules, circuits, etc., or functions described as being performed by multiple blocks, components, devices, systems, modules, circuits, etc. may be performed by a single block, component, device, system, module, circuit, etc.

It is also to be understood and appreciated that, while various embodiments are described herein as including both DCD pre-compensation and bit-level ISI pre-compensation, either type of pre-compensation may be omitted if desired. For instance, the pre-compensation scheme may include only DCD pre-compensation (and not bit-level ISI pre-compensation) or may include only bit-level ISI pre-compensation (and not DCD pre-compensation).

Figure 3:
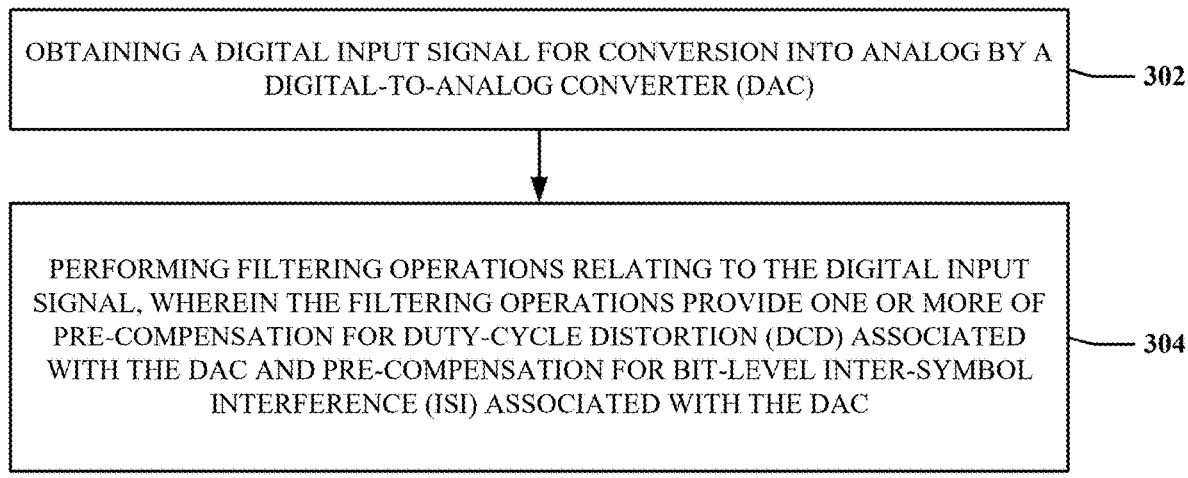
FIG. 3 depicts an illustrative embodiment of a method in accordance with various aspects described herein.

FIG. 3 depicts an illustrative embodiment of a method 300 in accordance with various aspects described herein.

At 302, the method can include obtaining a digital input signal for conversion into analog by a digital-to-analog converter (DAC). For example, the pre-compensation system 240 may, similar to that described above with respect to at least FIG. 2D, perform one or more operations that include obtaining a digital input signal for conversion into analog by a digital-to-analog converter (DAC).

At 304, the method can include performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC. For example, the pre-compensation system 240 may, similar to that described above with respect to at least FIG. 2D, perform one or more operations that include performing filtering operations relating to the digital input signal x[n], wherein the filtering operations provide one or more of pre-compensation for duty-cycle distortion (DCD) associated with the DAC (DCD pre-compensation block 242) and pre-compensation for bit-level inter-symbol interference (ISI) associated with the DAC (bit-level ISI pre-compensation block 244).

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
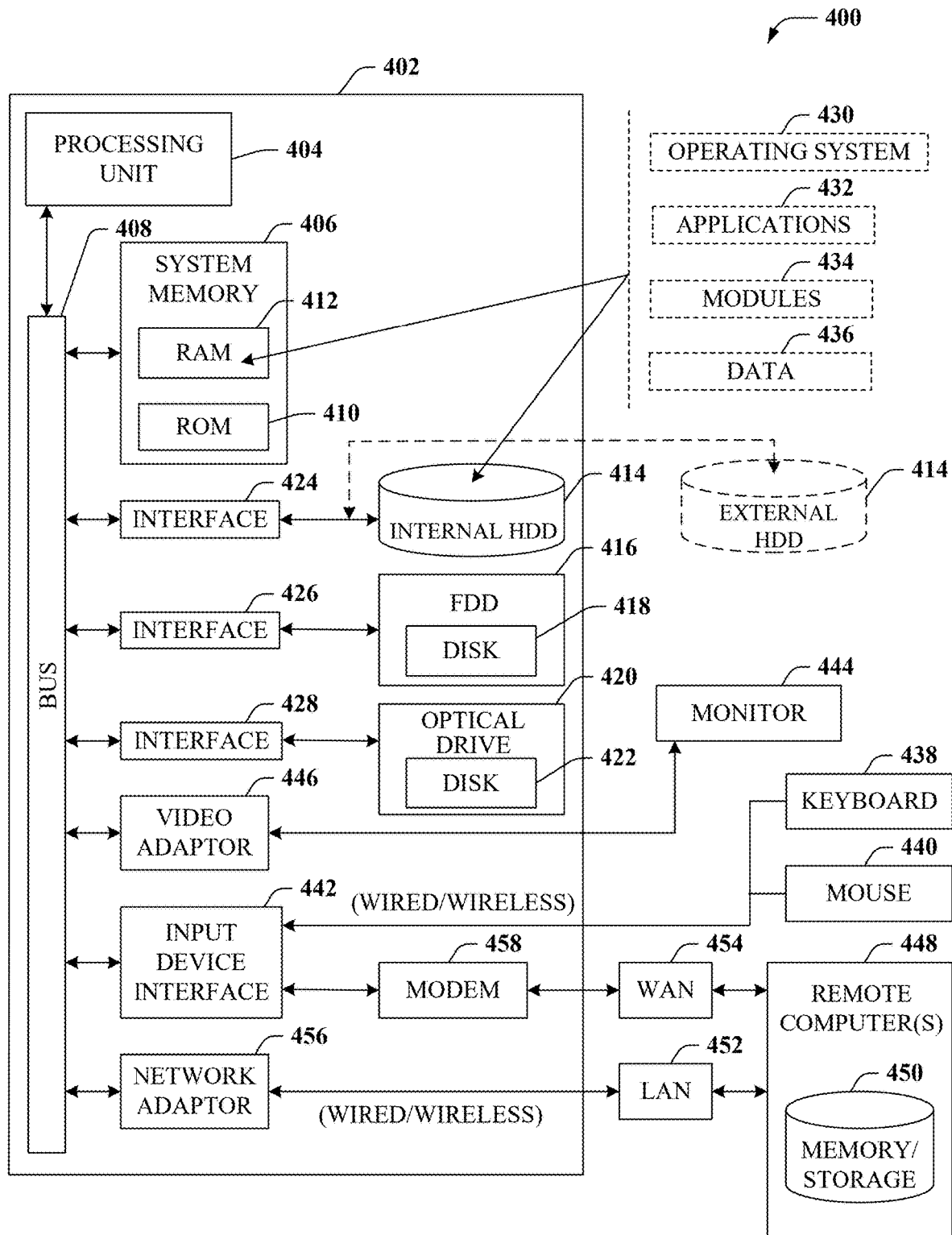
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part DCD and bit-level ISI pre-compensation for a DAC.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A device, comprising:
    a processing system including a processor, the processing system being coupled to a memory that stores executable instructions or data that, when executed or utilized by the processing system, facilitate performance of operations, the operations comprising
    obtaining a digital input signal for conversion into analog by a digital-to-analog converter (DAC); and
    performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

2. The device of claim 1, wherein the filtering operations comprise
    first filtering operations relating to the digital input signal that provide the pre-compensation for the DCD, resulting in an intermediate signal; and
    second filtering operations relating to the intermediate signal that provide the pre-compensation for the bit-level ISI.

3. The device of claim 1, wherein the filtering operations comprise
    first filtering operations relating to the digital input signal that provide the pre-compensation for the DCD, resulting in a first intermediate signal;
    second filtering operations relating to the digital input signal that provide the pre-compensation for the bit-level ISI, resulting in a second intermediate signal; and
    a summation operation that derives a sum of the first intermediate signal and the second intermediate signal.

4. The device of claim 1, wherein the filtering operations comprise
    first filtering operations relating to the digital input signal that provide the pre-compensation for the bit-level ISI, resulting in an intermediate signal; and
    second filtering operations relating to the intermediate signal that provide the pre-compensation for the DCD.

5. The device of claim 1, wherein the filtering operations comprise, for each bit stream of the digital input signal associated with each sub-DAC of the DAC, first filtering operations relating to that bit stream to compensate for a common function across all bits of that bit stream that represents DCD, and second filtering operations relating to that bit stream to compensate for differences between transfer functions of bits in that bit stream that represent bit-level ISI.

6. The device of claim 1, wherein the filtering operations that provide the pre-compensation for the DCD are implemented in a digital domain.

7. The device of claim 1, wherein the filtering operations that provide the pre-compensation for the DCD are based on pre-compensation parameters that are determined from modeling the DCD in a time domain as K independent finite impulse response (FIR) filters of length 2M+1, wherein K corresponds to a number of phases or clock cycles, and wherein 2M+1 corresponds to a number of filter taps.

8. The device of claim 1, wherein the filtering operations that provide the pre-compensation for the bit-level ISI is implemented in a digital domain.

9. The device of claim 1, wherein the filter functions that provide the pre-compensation for the bit-level ISI are based on pre-compensation parameters that are determined from modeling the bit-level ISI in a time domain as a set of B filters that each corresponds to an impulse response of a respective bit, and wherein B is a bit length of the DAC.

10. The device of claim 1, wherein the DAC is time-interleaved.

11. The device of claim 1, wherein the device comprises one or more programmable circuits.

12. The device of claim 1, wherein the operations further comprise causing a signal that results from the filtering operations to be provided to the DAC for the conversion into analog.

13. The device of claim 1, wherein the DAC includes a plurality of sub-DACs, and wherein the DCD results from a difference in sampling periods used for sampling outputs of even and odd sub-DACs of the plurality of sub-DACs or from a phase difference between clocks that operate the even and odd sub-DACs.

14. The device of claim 1, wherein the DAC includes a plurality of sub-DACs, and wherein the bit-level ISI results from different amplitude responses associated with different clocks used to operate the plurality of sub-DACs.

15. A non-transitory machine-readable medium, comprising executable instructions that, when executed by a processing system including a processor, facilitate performance of operations, the operations comprising:
    obtaining a digital input signal for conversion into analog by a digital-to-analog converter (DAC); and
    performing filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

16. The non-transitory machine-readable medium of claim 15, wherein the filtering operations comprise first filtering operations relating to the digital input signal that provide the pre-compensation for the DCD, resulting in an intermediate signal; and second filtering operations relating to the intermediate signal that provide the pre-compensation for the bit-level ISI.

17. The non-transitory machine-readable medium of claim 15, wherein the filtering operations that provide the pre-compensation for the DCD are implemented in a digital domain and include filter functions that are determined based on time domain modeling of the DCD.

18. The non-transitory machine-readable medium of claim 15, wherein the DAC is time-interleaved.

19. The non-transitory machine-readable medium of claim 15, wherein the operations further comprise causing a signal that results from the filtering operations to be provided to the DAC for the conversion into analog.

20. A method, comprising:

obtaining, by a processing system including a processor, a digital input signal for conversion into analog by a digital-to-analog converter (DAC); and performing, by the processing system, filtering operations relating to the digital input signal, wherein the filtering operations provide one or more of pre-compensation for duty-cycle distortion (DCD) associated with the DAC and pre-compensation for bit-level inter-symbol interference (ISI) associated with the DAC.

* * * * *